United States Patent [19]

Kennedy et al.

[11] 3,886,246

[45] May 27, 1975

[54] METHOD OF PRODUCING A SILICONIZED SILICON CARBIDE ARTEFACT

[75] Inventors: Peter Kennedy, Preston; Keith Taylor Scott, Thatcham, both of England

[73] Assignee: United Kingdom Atomic Energy Authority, London, England

[22] Filed: Oct. 31, 1972

[21] Appl. No.: 302,409

[30] Foreign Application Priority Data
Nov. 10, 1071   United Kingdom............... 52306/71

[52] U.S. Cl. ..................... 264/59; 264/63; 264/65; 264/67; 264/82; 264/154
[51] Int. Cl. ..................... C04b 33/32; C04b 35/64
[58] Field of Search ............ 264/59, 67, 63, 65, 44, 264/154, 155, 48, 344, DIG. 44, 313, 317, 82

[56] References Cited
UNITED STATES PATENTS

| | | | |
|---|---|---|---|
| 2,057,349 | 10/1936 | Rentschler | 264/59 |
| 2,431,326 | 11/1947 | Heyroth | 264/29 |
| 3,035,325 | 5/1962 | Nicholson et al. | 264/29 |
| 3,095,316 | 6/1963 | Hartwig | 264/29 |
| 3,166,614 | 1/1965 | Taylor | 264/29 |
| 3,385,723 | 5/1968 | Pickar | 264/29 |
| 3,467,745 | 9/1969 | Lambertson | 264/344 |
| 3,528,809 | 9/1970 | Farnand et al. | 264/59 |

FOREIGN PATENTS OR APPLICATIONS

| | | | |
|---|---|---|---|
| 482,104 | 3/1938 | United Kingdom | 264/59 |

*Primary Examiner*—Donald J. Arnold
*Attorney, Agent, or Firm*—Larson, Taylor and Hinds

[57] ABSTRACT

A method of providing a hole in a siliconised silicon carbide artefact in which a geometric shape is formed within green silicon carbide and filled with carbon of density at least 0.963 gm/cc to protect the shape during siliconising and the carbon is then removed.

6 Claims, No Drawings

METHOD OF PRODUCING A SILICONIZED SILICON CARBIDE ARTEFACT

This invention relates to silicon carbide artefacts.

BACKGROUND OF THE INVENTION

Self-bonded silicon carbide artefacts can be produced by a siliconising process, that is by exposing an artefact formed from a coherent mixture of silicon carbide and carbon, hereinafter referred to as green silicon carbide, to the action of silicon. It is sometimes difficult however to provide holes having smooth crack-free walls in such artefacts. Holes may be drilled or sputtered out in the siliconised artefacts but this is a slow process if cracking or other damage to the surrounding silicon carbide is to be avoided. Alternatively the required holes can be formed in the green artefact but these holes tend to fill up with silicon during the subsequent siliconising process and the silicon has then to be drilled or sputtered out. This presents the same problems as making holes in the siliconised product.

SUMMARY OF THE INVENTION

According to the present invention a geometric shape within a green silicon carbide artefact is protected during a siliconising process by graphite of density at least 0.963 gm/cc filling the shape.

The invention therefore consists in a green silicon carbide artefact having a geometric shape formed therein and containing graphite of destiny at least 0.963 gm/cc.

The invention also consists in a siliconised (self-bonded) silicon carbide artefact having a geometric shape formed therein containing graphite.

By selecting graphite of density at least 0.963 gm/cc permeation of the graphite shape by silicon during the siliconising process is resisted and an impermeable layer of silicon carbide is formed on the surface of the graphite shape during the early stages of the process. The graphite shape may be removed after siliconising by drilling or burning out.

In the green silicon carbide artefact the geometric shape may be filled with solid graphite, compacted graphite powder or a graphite plastic mix. The green silicon carbide artefact may be formed about the graphite while the artefact still contains a binder. Alternatively the graphite may be inserted in a green silicon carbide artefact having the required geometric shape formed therein and this may be done before or after debonding of the artefact. Where a graphite plastic mix is used it may conveniently be debonded with the artefact. It is to be noted that for the invention to be effective the density of the graphite has to be at least 0.968 gm/cc and that the density of a plastic mix or compacted powder will have to be higher than that.

Where a carbon lining to the geometric shape within the artefact is acceptable or even desirable in the finished artefact the shape formed in the green artefact may be oversize. It is then only necessary to drill out the graphite required to make a hole of the correct size after firing. It is possible in this way to make holes of complicated shape simply. Thus a generally cylindrical hole may be finished with a flat end or a cone shaped end or provided with a shoulder intermediately.

Where the shape is required to provide a fine jet, for example, it has been found preferable to form a hole in the green artefact which does not extend right through the artefact, to fill this blind hole with carbon and after siliconising to drill out the hole as originally formed. Then a capillary size hole can be spark eroded from the blind face of the artefact to meet the original hole.

DETAILED DESCRIPTION OF THE INVENTION

In an example of one way of carrying the invention into effect a spinneret is produced by the following steps:
1. Extrude a slab of green silicon carbide and part off in suitable lengths to form blanks.
2. Partially dry the blanks at room temperature and cure at 100°C for 4 hours.
3. Drill one-sixteenth inch dia. holes (using a No 52 tungsten carbide tipped drill) in each blank. The holes should terminate 25 hundredths of an inch + one thousandths of an inch from the opposite face.
4. Insert graphite pegs of diameter sixty two hundredths of an inch in the holes and press firmly home.
5. Debond at 50°C/h to 370°C and hold for 12 hours.
6. Heat up to 1,000°C in argon over a period of 4 hours and cool.
7. Fire in contact with molten silicon for 3 hours.
8. Grit blast excess silicon from the surfaces
9. Drill out the graphite pegs using a three sixty-fourth inch drill and heat in air up to 1,000°C to burn out the residual graphite.
10. Grind back face flat and grind front face parallel.
11. Shape further as necessary.
12. Spark erode capillary holes nine thousandth of an inch ± ten thousandth of an inch into the front face to meet and be coaxial with the lead holes using an eight thousandth of an inch rotating Elkonite electrode.

In another embodiment of the invention a green artefact may be reduced in size by extrusion after insertion of plastic graphite. In this way a series of fine holes can be obtained in a relatively small artefact. In yet another embodiment composite tubes of silicon carbide with an interlayer of graphite may be produced. These composite tubes may be extruded after formation and before firing, if desired, to facilitate manufacture. They can be used where an electrically conducting ceramic is required and the inner tube of silicon carbide may be replaced by a rod. In certain circumstances the composite tubes find application as sheaths for nuclear fuel material.

We claim:
1. A method of producing a siliconized silicon carbide artefact having a geometric shape formed therein, in which method a green silicon carbide artefact having a geometric shape therein filled with graphite of density at least 0.963 gm/cc is siliconized by contact with silicon and the graphite is then at least in part removed.
2. A method as claimed in claim 1 wherein, after siliconising the artefact, the graphite is removed at least in part by drilling.
3. A method as claimed in claim 1 wherein, after siliconising the artefact, the graphite is removed at least in part by burning out.
4. A method as claimed in claim 1 wherein the graphite is compacted graphite powder.
5. A method as claimed in claim 1 wherein, after siliconising the artefact, the graphite is removed at least in part to provide a hole and the hole is extended into the silicon artefact by subjecting said artefact to spark erosion.
6. A method as claimed in claim 1 wherein the green silicon carbide artefact is extruded after insertion of the graphite.

* * * * *